United States Patent
Liu et al.

(10) Patent No.: US 9,944,804 B1
(45) Date of Patent: Apr. 17, 2018

(54) WATER-WASHABLE RESIN FORMULATIONS FOR USE WITH 3D PRINTING SYSTEMS AND METHODS

(71) Applicant: Full Spectrum Laser, LLC, Las Vegas, NV (US)

(72) Inventors: Henry Liu, Las Vegas, NV (US); Chunlin He, Las Vegas, NV (US)

( * ) Notice: Subject to any disclaimer, the term of this patent is extended or adjusted under 35 U.S.C. 154(b) by 0 days.

(21) Appl. No.: 15/651,983

(22) Filed: Jul. 17, 2017

Related U.S. Application Data

(62) Division of application No. 15/177,678, filed on Jun. 9, 2016.

(60) Provisional application No. 62/173,501, filed on Jun. 10, 2015.

(51) Int. Cl.
| | |
|---|---|
| *C08F 2/46* | (2006.01) |
| *C08F 2/50* | (2006.01) |
| *C08G 61/04* | (2006.01) |
| *C09D 11/106* | (2014.01) |
| *B33Y 70/00* | (2015.01) |
| *C09D 133/08* | (2006.01) |
| *C08F 222/10* | (2006.01) |

(52) U.S. Cl.
CPC ............ *C09D 11/106* (2013.01); *B33Y 70/00* (2014.12); *C09D 133/08* (2013.01); *C08F 2222/1026* (2013.01)

(58) Field of Classification Search
CPC ................. C09D 11/106; C09D 133/08; C08F 2222/1036; B33Y 70/00
USPC .................................. 522/170, 168, 1; 520/1
See application file for complete search history.

(56) References Cited

U.S. PATENT DOCUMENTS

| | | | | |
|---|---|---|---|---|
| 4,977,511 A | * | 12/1990 | Gottschalk | A61K 6/0023 430/170 |
| 9,574,039 B1 | * | 2/2017 | Liu | C09J 4/06 |
| 2003/0059708 A1 | * | 3/2003 | Yamamura | G03F 7/0037 430/269 |
| 2007/0043138 A1 | * | 2/2007 | Yamamura | C08F 255/00 522/168 |
| 2016/0244628 A1 | * | 8/2016 | Breton | C09D 11/34 |
| 2017/0022312 A1 | * | 1/2017 | Liu | C09J 4/06 |

* cited by examiner

*Primary Examiner* — Jessica Whiteley
(74) *Attorney, Agent, or Firm* — FisherBroyles, LLP; Rob L. Phillips

(57) ABSTRACT

A water washable resin formulation for 3D printing having at least one water-soluble and/or water-dispersible ingredient such as an oligomer and/or monomer. In one example, a water-soluble ingredient is greater than 1% by weight of the resin formulation. A water-soluble or water-dispersible filler may also be used as an ingredient in the resin formulation. The water-washable photopolymer resin formulation allows printed 3D objects to be cleaned with water rather than organic solvents. Because the water-washable photopolymer resin formulation is insoluble when cured, only the uncured water-washable photopolymer resin formulation is washed away. Depending on the filler's property and compatibility with the other ingredients of the resin formulation, the blending of filler therein can be used to modify the mechanical and chemical properties of the printed 3D objects.

8 Claims, No Drawings

WATER-WASHABLE RESIN FORMULATIONS FOR USE WITH 3D PRINTING SYSTEMS AND METHODS

CROSS-REFERENCE

This application is a divisional application of U.S. patent application Ser. No. 15/177,678 filed Jun. 9, 2016 which claims priority to U.S. Patent Application No. 62/173,501 filed Jun. 10, 2015, both which are incorporated herein for all purposes.

FIELD OF THE INVENTION

The embodiments of the present invention relate to water washable resin formulations which may be used with 3D printing systems, including, but not limited to, stereolithography systems and methods.

BACKGROUND

Additive manufacturing, also known as 3D printing, is any of various processes used to make a three-dimensional object. With 3D printing, additive processes are used, in which successive layers of material are laid down under computer control. A 3D printed object is typically created through sequential construction of thin layers (i.e., slices) following a digital model. Stereolithography (SL) is one particular type of additive manufacturing wherein a liquid polymer resin is hardened by selective exposure to radiation to form a thin layer. The shape of the hardened thin layer is defined by the pattern of a subject slice of the digital model. The energy source of radiation can be in the form of electromagnetic waves or electron beam. The common energy source is ultraviolet, visible or infrared radiation. The liquid photopolymer resin used to form the 3D object can contain multiple components including monomers, oligomers, photoinitiators, blockers, colorants and other additives.

One challenge encountered with SL is the presence of uncured or partially-cured resin on the surfaces of the printed 3D object. Uncured resin must be removed and partially-cured resins render the object tacky and difficult to clean. Because most of the current resin formulations apply monomers or oligomers that are soluble only in certain organic solvents, the 3D printed objects need to be washed by rinsing or utilization of ultrasonication with organic solvents, such as isopropanol or acetone. The organic solvents are often volatile organic chemicals (VOCs) which are regulated by the Environmental Protection Agency (EPA) and Occupational Safety and Health Administration (OSHA). The use of organic solvents has several disadvantages: first, the organic solvents are flammable and harmful to the human body and environment making them less than ideal chemicals for use by ordinary users of 3D printing systems having little or no knowledge of chemistry; second, the storage and disposal of organic solvents can be challenging; and third, organic solvents add costs to printing the 3D objects.

Another challenge encountered with SL is shrinkage. Polymerization shrinkage happens during hardening of the liquid photopolymer resin. The shrinkage during SL, 3D printing can result in printing inaccuracies, such as shrunken size or even warped objects, as well as a high probability of failed printing, such as detachment between two adjacent thin layers. It is well known that polymerization shrinkage is due to the space reduction related to van der Waals spaces being substituted by chemical covalent bond spaces where monomer/oligomer molecules are converted into a polymer network.

It would be advantageous to develop a water-washable resin formulation which overcomes the drawbacks noted herein as well as improving 3D printing systems and methods.

SUMMARY

The embodiments of present invention relate to additive manufacturing. More particularly, the embodiments of the present invention relate to SL. Even more particularly, the embodiments of the present invention relate to photopolymer resins used with SL. The embodiments of the present invention demonstrate safer liquid resin formulations for 3D printed objects fabricated with stereolithography 3D printers wherein the formulations allow the objects to be washed with water.

The embodiments of the present invention overcome the above-noted drawbacks by using water-soluble oligomers and/or monomers and/or filler as the primary ingredient in the photopolymer resin formulation. The water-soluble photopolymer resin allows printed objects to be cleaned with water rather than organic solvents. Because the water-soluble photopolymer resin formulation is insoluble when cured, only the uncured water-soluble photopolymer resin formulation is washed away. Water is readily available, safe, cheap, easy-to-use and creates minimal waste.

Another embodiment of the present invention overcomes the above-noted drawbacks by using water-dispersible ingredients, without any water-soluble ingredients, allowing excess resin to be washed from the surface of the printed 3D object using water.

The embodiments of the present invention demonstrate that blending filler into a water-soluble resin formulation lowers the shrinkage significantly. Depending on the filler's property and compatibility with the rest of the resin formulation, the blending of filler therein can tune the mechanical and chemical properties of the printed 3D objects.

It is well recognized in the field of liquid photopolymer resins that hybrid radiation curable resins produce cured printed 3D objects with improved stiffness and toughness. A hybrid liquid radiation curable resin is a curable resin that comprises both free radical and cationic polymerizable components and photoinitiators. The embodiments of the present invention show that water-soluble hybrid liquid radiation curable resins are capable of forming cured printed 3D objects with improved stiffness and toughness.

Other variations, embodiments, and features of the present invention will become evident from the following detailed description, drawings and claims.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

A few of the advantages of the embodiments of the present invention include: (i) easy cleaning of printed 3D objects at a low cost; (ii) easy removal of the partially-cured tacky surface of printed 3D objects because the primary ingredient of the resin formulation is water-soluble; (iii) less exposure to hazardous chemicals during the cleaning process and (iv) the creation of less solvent wastes.

Referring now to a first embodiment of the present invention, Tables 1 and 2 detail two exemplary water-washable resin formulations having 94.03% or 4.00% by weight of a water-soluble oligomer, 4.95% or 94.98% by weight of an at least partially water-soluble monomer, 0.99% by weight of a photoinitiator and 0.03% by weight of a light blocker which in this instance is also an optical brightener.

TABLE 1

| Materials | Concentration (% by weight) | Function |
|---|---|---|
| MIRAMER PE220 | 94.03 | Oligomer |
| Trimethylolpropane Triacrylate | 4.95 | Monomer |
| Irgacure TPO | 0.99 | Photoinitiator |
| Benetex OB Plus | 0.03 | Blocker/Brightener |

TABLE 2

| Materials | Concentration (% by weight) | Function |
|---|---|---|
| MIRAMER PE220 | 4.00 | Oligomer |
| Trimethylolpropane Triacrylate | 94.98 | Monomer |
| Irgacure TPO | 0.99 | Photoinitiator |
| Benetex OB Plus | 0.03 | Blocker/Brightener |

In further detail, still referring to the embodiments of the present invention as set forth in Tables 1 and 2, the amount of water-soluble ingredients in the resin formulation is sufficient to allow the printed 3D objects using this formulation resin to be washed with water leaving a dry surface. While Table 1 lists an oligomer of MIRAMER PE220 and a monomer of Trimethylolpropane Triacrylate, those skilled in the art will recognize other water-soluble oligomers and monomers may be used. A water-soluble filler may be added as well (see Tables 3 and 4).

Referring now to a second embodiment of the present invention, Tables 3 and 4 detail two exemplary water-washable resin formulations having 89.09% or 4.14% by weight of a water-soluble oligomer, 4.95% or 89.90% by weight of an at least partially water-soluble monomer, 4.95% by weight of water-soluble filler, 0.99% by weight of a photoinitiator and 0.02% by weight of a light blocker which in this instance is also an optical brightener.

TABLE 3

| Materials | Concentration (% by Weight) | Function |
|---|---|---|
| MIRAMER PE220 | 89.09 | Oligomer |
| TMPTA | 4.95 | Monomer |
| Celvol 203S | 4.95 | Filler |
| TPO | 0.99 | Photoinitiator |
| OB+ | 0.02 | Blocker/Brightener |

TABLE 4

| Materials | Concentration (% by Weight) | Function |
|---|---|---|
| MIRAMER PE220 | 4.14 | Oligomer |
| TMPTA | 89.90 | Monomer |
| Celvol 203S | 4.95 | Filler |
| TPO | 0.99 | Photoinitiator |
| OB+ | 0.02 | Blocker/Brightener |

In further detail, still referring to the invention of Tables 3 and 4, the water-soluble filler may be a solid with a glass transition temperature at 87° C. Other water-soluble fillers may be used as well. The shrinkage of printed 3D objects is lowered because the water-soluble filler is not radiation curable and does not have the polymerization shrinkage. In addition, the water-soluble filler modifies the mechanical properties of the printed 3D objects because the printed 3D objects have properties from both the polymerized liquid oligomer or monomer and the added filler. For example, the appropriate use of filler with high hardness and toughness renders printed 3D objects harder or tougher than the formulation with only oligomers or monomers. By changing the amount and type of filler, manufacturers may manipulate the mechanical properties of the resultant printed 3D objects.

Referring now to a third embodiment of the present invention, Tables 5 and 6 detail an exemplary water-washable resin formulation having 88.06% or 4.00% by weight of a water-soluble oligomer, 9.78% or 93.84% by weight of an at least partially water-soluble monomer, 0.98% by weight of a free radical photoinitiator, 0.98% by weight of photo acid generator and 0.2% by weight of a photosensitizer.

TABLE 5

| Materials | Concentration (% by weight) | Function |
|---|---|---|
| MIRAMER PE220 | 88.06 | Acrylate Oligomer |
| CELLOXIDE 2021P | 9.78 | Epoxy monomer |
| TPO | 0.98 | Free Radical Photoinitiator |
| Irgacure 290 | 0.98 | Photo Acid Generator |
| TR-PSS-303 | 0.2 | Photosensitizer |

TABLE 6

| Materials | Concentration (% by weight) | Function |
|---|---|---|
| MIRAMER PE220 | 4.00 | Acrylate Oligomer |
| CELLOXIDE 2021P | 93.84 | Epoxy monomer |
| TPO | 0.98 | Free Radical Photoinitiator |
| Irgacure 290 | 0.98 | Photo Acid Generator |
| TR-PSS-303 | 0.2 | Photosensitizer |

Tables 5 and 6 list 9.78% or 93.84% by weight of difunctional epoxy monomer in the formulation. The light curing process of epoxy monomer starts with photon absorption by a photosensitizer after which the absorbed energy is transferred to the photo acid generator starting the generation of acid, more particularly protons. The hardening of epoxy monomer is triggered by the protons generated by the photo acid generator. In this embodiment of present invention, the curing of acrylate oligomer/monomer first forms the initial shape of the printed 3D objects and the epoxy in the resin gradually hardens the printed 3D objects because acrylate oligomer/monomer cures faster than the epoxy correspondents. While Tables 1-3 show 4.00% or more by weight of water-soluble ingredients, depending on the embodiment, the water-soluble ingredients may comprise 1% or greater by weight of the water-washable resin formulation.

There are several benefits of using epoxy in a radiation curable formulation. First, the epoxy monomer serves as a diluent having a low viscosity allowing easier processing of the resin. Second, it is well known that the curing of epoxy monomer has lower shrinkage and therefore the shrinkage of the formulation is lower compared with the acrylate components only. Third, the inclusion of epoxy monomer improves the printed 3D objects mechanical properties by increasing toughness and tensile strength. Fourth, the epoxy monomer also improves the finishing of the printing by post-curing because the curing of epoxy is not inhibited by oxygen and is relatively slow.

While Tables 1, 3 and 5 show large percentages of water-soluble oligomer, those skilled in the art will recognize that other percentages fall within the spirit and scope of the present invention. In one embodiment, the water-soluble components may make up more than 90% by weight of the resin formulation. In another embodiment, the water-soluble components may make up more than 85% (i.e., the primary ingredient) of the resin formulation. Similarly, the water-soluble component monomer may make up more or less than 5% of the resin formulation as can the filler.

Referring now to another embodiment of the present invention, Tables 7 and 8 detail an exemplary water-washable resin formulation with all water-insoluble components having 69.29% or 2.35% by weight of a water-dispersible oligomer, 29.69% or 96.63% by weight of a water-insoluble monomer, 0.99% by weight of a free radical photoinitiator and 0.03% by weight of a light blocker which in this instance is also an optical brightener. Unlike water-soluble ingredients which form a homogeneously mixed solution at the molecular level when mixed with water (e.g., syrup, where sugar is dissolved in water), water-dispersible components form a suspension when mixed with water, micelle or lipozome (e.g. milk).

TABLE 7

| Materials | Concentration (% by weight) | Function |
| --- | --- | --- |
| XR-9416 | 69.29 | Oligomer |
| SR506 | 29.69 | Monomer |
| Irgacure TPO | 0.99 | Photoinitiator |
| Benetex OB Plus | 0.03 | Blocker/Brightener |

TABLE 8

| Materials | Concentration (% by weight) | Function |
| --- | --- | --- |
| XR-9416 | 2.35 | Oligomer |
| SR506 | 96.63 | Monomer |
| Irgacure TPO | 0.99 | Photoinitiator |
| Benetex OB Plus | 0.03 | Blocker/Brightener |

In further detail, still referring to Tables 7 and 8, none of the ingredients in listed in Table 7 and 8 is water-soluble. In this embodiment, the oligomer XR-9416 is an amphiphilic molecule which has both hydrophobic and hydrophilic ends. When combined with water, the amphiphilicity of XR-9416 wraps the uncured water-insoluble ingredients into micelles or lipozomes, which are then washed away leaving a dry surface on the printed 3D object. While Table 7 and 8 list an oligomer of XR-9416 and a monomer of SR506, those skilled in the art will recognize other amphiphilic oligomers and monomers may be used. A water-soluble filler may be added as well.

TABLE 9

| Materials | Concentration (% by weight) | Function |
| --- | --- | --- |
| MIRAMER PE220 | 19.00 | Oligomer |
| XR-9416 | 4.95 | Oligomer |
| DPGDA | 75.03 | Monomer |
| Irgacure TPO | 0.99 | Photoinitiator |
| Benetex OB Plus | 0.03 | Blocker/Brightener |

TABLE 10

| Materials | Concentration (% by weight) | Function |
| --- | --- | --- |
| MIRAMER PE220 | 4.00 | Oligomer |
| XR-9416 | 15.18 | Oligomer |
| DPGDA | 79.80 | Monomer |
| Irgacure TPO | 0.99 | Photoinitiator |
| Benetex OB Plus | 0.03 | Blocker/Brightener |

Water-soluble and water-dispersible ingredients may be used in combination to create a water-washable resin formulation. Tables 9 and 10 show such embodiments wherein the water-soluble resin formulation may include 1% or more by weight of water-dispersible ingredients in combination with 1% or more by weight water-soluble ingredients to form a water-washable resin formulation. That is, the use of a water-dispersible ingredient reduces the volume of water-soluble ingredients needed for the water-washable resin formulation. For example, a water-soluble resin formulation may include 1% or more by weight of water-dispersible ingredients in combination with 1% or more by weight water-soluble ingredients to form a water-washable resin formulation. When used without water-soluble ingredients, 1% or more by weight of water-dispersible ingredients renders the resultant resin formulation water-washable. The percentages of the water-dispersible ingredients and water-soluble ingredients may be manipulated as desired.

While the foregoing written description of the embodiments of the present invention enable one of ordinary skill to make and use what is considered presently to be the best mode thereof, those of ordinary skill will understand and appreciate the existence of variations, combinations, and equivalents of the specific embodiment, method, and examples herein. The invention herein should therefore not be limited by the above-described embodiments, methods, and examples, but by all embodiments and methods within the scope and spirit of the invention as claimed.

We claim:

1. A water-washable 3D printing resin formulation comprising:
    1% or more by weight in aggregate of one or more water-dispersible ingredients selected from the group comprising an oligomer and monomer 1% or more by weight in aggregate of one or more water-insoluble ingredients selected from the group comprising an oligomer and monomer;
one or more of a: (i) photoinitiator and (ii) light blocker; and
wherein, responsive to water being added, said water-dispersible ingredients wrap and carry away any uncured water-insoluble ingredients in micelles or lipozomes.

2. The water-washable 3D printing resin formulation of claim 1 comprising about 69.29% by weight of a water-dispersible oligomer, about 29.69% by weight of a water-insoluble monomer, about 0.99% by weight of a free radical photoinitiator and about 0.03% by weight of a light blocker.

3. The water-washable 3D printing resin formulation of claim 1 wherein said light blocker is also an optical brightener or colorant.

4. The water-washable 3D printing resin formulation of claim 1 comprising about 2.35% by weight of a water-dispersible oligomer, about 96.63% by weight of a water-insoluble monomer, about 0.99% by weight of a free radical photoinitiator and about 0.03% by weight of a light blocker.

5. The water-washable 3D printing resin formulation of claim 4 wherein said light blocker is also an optical brightener or colorant.

6. The water-washable 3D printing resin formulation of claim 1 wherein said oligomer is amphiphilic.

7. The water-washable 3D printing resin formulation of claim 1 wherein said monomer is amphiphilic.

8. The water-washable 3D printing resin formulation of claim 1 further comprising a water-soluble filler.

* * * * *